US011321634B2

(12) United States Patent
Lee et al.

(10) Patent No.: US 11,321,634 B2
(45) Date of Patent: May 3, 2022

(54) MINIMIZING RISK USING MACHINE LEARNING TECHNIQUES

(71) Applicant: International Business Machines Corporation, Armonk, NY (US)

(72) Inventors: Sunhwan Lee, San Mateo, CA (US); Pawan Chowdhary, San Jose, CA (US); Guangjie Ren, Belmont, CA (US); Raphael I. Arar, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 16/418,367

(22) Filed: May 21, 2019

(65) Prior Publication Data
US 2020/0372397 A1   Nov. 26, 2020

(51) Int. Cl.
G06Q 30/00   (2012.01)
G06N 20/00   (2019.01)
G06Q 10/06   (2012.01)

(52) U.S. Cl.
CPC ......... *G06N 20/00* (2019.01); *G06Q 10/0635* (2013.01)

(58) Field of Classification Search
CPC .......................... G06N 20/00; G06Q 10/0635
See application file for complete search history.

(56) References Cited

U.S. PATENT DOCUMENTS

| | | | |
|---|---|---|---|
| 5,948,040 A | 9/1999 | DeLorme et al. | |
| 7,962,354 B2 | 6/2011 | Liew et al. | |
| 8,301,550 B2 | 10/2012 | Pappas et al. | |
| 9,443,252 B2 | 9/2016 | Chang et al. | |
| 2008/0103804 A1* | 5/2008 | Latta | G06Q 10/06 705/1.1 |
| 2015/0058050 A1 | 2/2015 | Tebourbi et al. | |
| 2017/0357716 A1 | 12/2017 | Bellegarda et al. | |
| 2018/0032918 A1 | 2/2018 | Pradeep et al. | |
| 2020/0162515 A1* | 5/2020 | Dubinsky | G06N 20/00 |
| 2020/0175586 A1* | 6/2020 | McKenna | G06N 20/00 |
| 2020/0382523 A1* | 12/2020 | Traore | G06K 9/6217 |
| 2021/0279730 A1* | 9/2021 | Kumar | G06N 5/025 |

OTHER PUBLICATIONS

Anonymous, Generating Travel Itineraries Based on User Interests, ip.com, Dec. 13, 2017.
CheapAir.com, CheapAir.com Annual Airfare Study Reveals the Best Times to Buy Flights, Apr. 6, 2017.

* cited by examiner

*Primary Examiner* — Alvin L Brown

(74) *Attorney, Agent, or Firm* — Lieberman & Brandsdorfer, LLC

(57) ABSTRACT

Embodiments relate to an intelligent computer platform to utilize machine learning techniques to minimize compliance risk. Features are extracted from one or more data sources across two or more domains and activity data is identified. Features are identified within the activity data which are used to create one or more models. Domain activity impact is measured and a risk probability is calculated. A policy is generated based on the calculated risk probability and one or more compliance activities are orchestrated. One or more encoded actions are executed in compliance with the orchestration.

20 Claims, 8 Drawing Sheets

MINIMIZING RISK USING MACHINE LEARNING TECHNIQUES

BACKGROUND

The present embodiments relate to an artificial intelligence platform and an optimization methodology to minimize risk across travel components. More specifically, the embodiments relate to understanding and measuring cross-impact between different travel components, and reinforcement learning for decision making.

SUMMARY

The embodiments include a system, computer program product, and method for cross-compliance risk assessment and optimization.

In one aspect, a computer system is provided with a processing unit and memory for use with an artificial intelligence (AI) computer platform to minimize compliance risk. The processing unit is operatively coupled to the memory and is in communication with the AI platform and embedded tools, which include a data manager, a machine learning (ML) manager, and a recommendation engine. The data manager functions to extract features from one or more data sources across two or more domains and identify activity data within the extracted features. The ML manager functions to identify features within the activity data, create one or models with the identified features, and measure the domain activity impact. The ML manager further calculates a risk probability based on the measured impact. The recommendation engine generates a policy from the calculated risk probability and further orchestrates one or more compliance activities based on the generated policy. One or more encoded actions in compliance with the orchestration are selectively executed by the processing unit.

In another aspect, a computer program device is provided to minimize compliance risk. The program code is executable by a processing unit to monitor and evaluate data and minimize risk across two or more domains. The program code extracts features from one or more data sources across two or more domains and identifies activity data within the extracted features. The program code identifies features within the activity data, creates one or models with the identified features, and measures the domain activity impact. A risk probability is calculated based on the measured impact. The program code further generates a policy from the calculated risk probability and orchestrates one or more compliance activities based on the generated policy. One or more of the encoded actions are executed in compliance with the orchestration.

In yet another aspect, a method is provided for compliance risk analysis and optimization. Features are extracted from one or more data sources across two or more domains and activity data is identified in the extracted features. Features are identified within the activity data which is used to create one or more models. Domain activity impact is measured and a risk probability is calculated based on the measured impact. A policy is generated based on the calculated risk probability and one or more compliance activities are orchestrated based on the generated policy. One or more encoded actions are executed in compliance with the orchestration.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
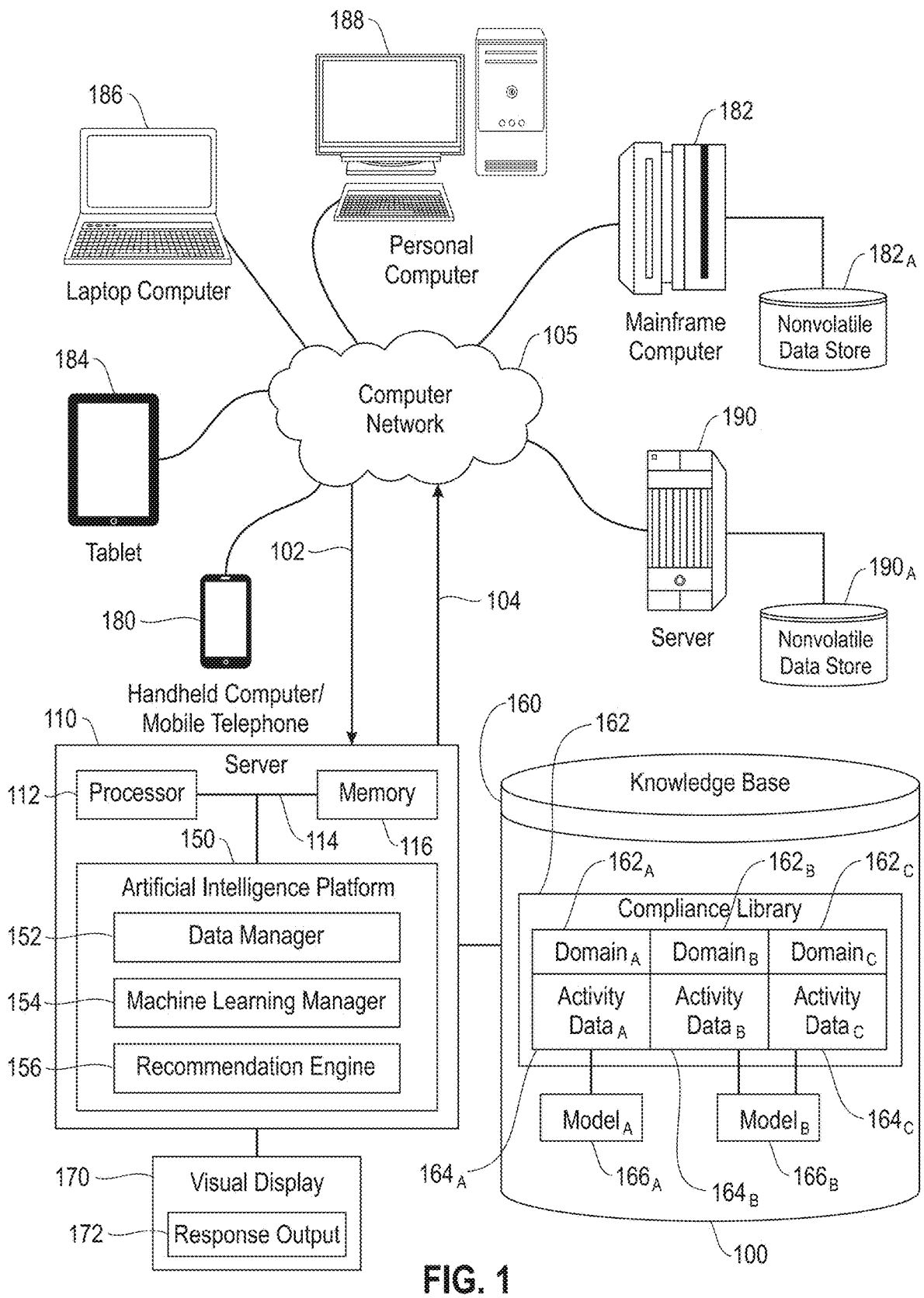
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is understood that there are different modes of travel, including business travel and personal travel. Business travel is undertaken for work or business purposes, and personal travel is directed at leisure. Although both business travel and personal travel may include overlapping travel components, they have different purposes and different express or inherent costs. Decision making associated with work related travel and booking of corresponding travel components is commonly directed at anticipating meetings, and in one embodiment accommodating cancellation of such meetings.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

In the field of information technology (IT), electronic interfaces are commonly utilized for communication and organization, including electronic mail and electronic calendars. Electronic mail relates to transmission of messages over a communications network. The electronic calendar, also referred to herein as a computer calendar, is a program that enables people to record events and appointments in an electronic format. Electronic calendars have enhanced functionality of a non-electronic calendar. For example, electronic calendars enable automatic entries for regular events, as well as signaling of upcoming events. One form of an electronic calendar is known as a scheduler, and it enables groups of users connected to a network to coordinate their schedules. The scheduler allows members of a group to view members' calendars, and sends communication scheduling to the group members through electronic mail.

Travel or the act of traveling is understood to be comprised of multiple components. For example, one of the components is directed at a mode of travel, e.g. automobile, train, airplane, etc. Another component is directed at lodging, including forms of lodging, location of lodging, length of lodging, etc. It is understood that each of the travel components, either considered individually or collectively, are subject to dynamic pricing, with associated costs subject to fluctuation based on supply and demand. For example, airline ticket prices and lodging are higher during times of peak demand and lower when demand decreases.

It is understood that travel may be subject to cancellation for various reasons, such as unforeseen illness or injury. With respect to work and work related travel, cancellation may occur for business related aspects, such as meeting cancellation or reschedule. Some aspects of travel and associated travel reservations may support refunds for cancellations, while other aspects may not support refunds. Accordingly, one of the cost factors associated with travel costs is cancellation and any corresponding cancellation fees.

Prior to arranging business travel, it is necessary to either anticipate or schedule a meeting that necessitates the travel. There are challenges associated with scheduling a meeting. Challenges include, but are not limited to, selecting a date and time in which all of the participants are available to attend the meeting, identifying the right participants to attend the meeting, and establishing a meeting location. Some of these challenges may be fluid and subject to change. At the same time, data identifying elements of the challenges may be explicitly or implicitly defined.

In addition to scheduling meetings based on the participants, their roles, and their physical locations, managing travel is another component. Travel and associated transportation will be described herein with respect to airline travel, although in one embodiment, travel may be expanded to include additional or alternative modes of transportation. Identifying a meeting location may be restricted by available flights or restrictive flight routes, airline schedules, etc. At the same time, costs associated with airline travel may play a factor in scheduling, including costs associated with rescheduling or cancelation in the event of meeting changes or meeting cancelation.

As shown and described herein, a system, method, and computer program product are provided and directed at reinforcement learning for decision making with respect to travel and travel arrangement. The reinforcement learning incorporates mitigating and managing risk associated with travel cancellation and associated cancellation costs. It is understood that there may be uncertainty of an event that may necessitate a travel event or a need to travel. As shown and described in detail below, the reinforcement learning includes an assessment of the probability of a meeting happening at a specific time and location, and determining an optimal time for advanced booking of travel elements, e.g. flight, hotel, etc. Accordingly, the system and processes shown and described in detail below demonstrate use of ML to account for such uncertainty, determine optimal timing for advanced travel booking, and facilitate execution of corresponding booking requirements.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including natural language processing and machine learning, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to estimate risk associated with booking travel, and design an optimization methodology to minimize the risk using machine learning techniques. The tools include, but are not limited to, a data manager (152), a machine learning (ML) manager (154), and a recommendation engine (156). The AI platform (150) may receive input from the network (105) and leverage a data source (160), also referred to herein as a corpus or knowledge base, to selectively access activity data. As shown the data source (160) is configured with a compliance library (162) with a plurality of multi-class classification models that are created and managed by the ML manager (154). Details of how the models are created are shown and described in detail below. It is understood that different domains, such as different business organizations or departments within the business organization may each be classified as a domain. In the example shown herein, the domains include, but are not limited to, $domain_A$ ($162_A$), $domain_B$ ($162_B$), and $domain_C$ ($162_C$). Although only three domains are shown and represented herein, the quantity should not be considered limiting. In one embodiment, there may be a different quantity of domains. Similarly, domains may be added to the library (162). Corresponding activity data is stored or categorized with respect to each of the domains by the data manager (152). As shown, $domain_A$ ($162_A$) includes $activity data_A$ ($164_A$), $domain_B$ ($162_B$) includes $activity data_B$ ($164_B$), and $domain_C$ ($162_C$) includes $activity data_C$ (164).

It is understood that the supervised learning leverages data from a data source. As shown herein, the data source is referred to as the knowledge engine (160) and is configured with domains and logically grouped activity data in the form of models. The data manager (152) functions to collect or extract data from the various computing devices (180), (182), (184), (186), (188), and (190) in communication with the network (105). Once collected, the ML manager (154) organizes or arranges the collected data from one or more of the computing devices into one or more of the corresponding models. Models may be created based on an intra-domain activity or inter-domain activity. Two models are shown herein, although the quantity and their relationships to the domains should not be considered limiting. $Model_A$ ($166_A$) is shown operatively coupled to $activity data_A$ ($164_A$), and is an intra-domain activity model. $Model_B$ ($166_B$) is shown operatively coupled to $activity data_B$ ($164_B$) and $activity data_C$ ($164_C$) and is an inter-domain activity model, also referred to herein as a multi-class classification model. The models reflect and organize activity data corresponding to the respective domain, including electronic mail communications and electronic calendar data. In one embodiment, each domain may be linked or associated with a plurality of email addresses, in which one or more topics form a communication thread. As communications are detected in an email thread, the activity data is updated by the data manager (152), and each model configured and operatively coupled to the activity data is dynamically updated by the ML manager (154).

It is understood that data may be collected at periodic intervals, with the data manager (152) collecting the data or changes in the data and the ML manager (154) reflecting the collected or changed data in an appropriately classified or operatively coupled model. In one embodiment, the data manager (152) may function in a dynamic manner, including, but not limited to, detecting changes to the collected data, and collecting the changed data. Similarly, the ML manager (154) utilizes one or more ML algorithm(s) to update a corresponding model to reflect and incorporate the data changes. In one embodiment, the data manager (152) may function in a sleep or hibernate mode when inactive, e.g. not collecting data, and may change to an active mode when changes to relevant or pertinent data are discovered. Accordingly, the data manager (152) functions as a tool to collect and organize data from one or more computing devices, with the ML manager (154) reflecting the organized data into one or more models.

The ML manager (154), which is shown herein operatively coupled to the data manager (152), functions as a tool to dynamically assess probability of an event happening based on the collected data reflected in the models. The ML manager (154) employs a probability algorithm to learn values of states or state histories, and to maximize utility of outcomes. States can involve various different states, including, but not limited to, user state, business states, etc. The probability algorithm produces output directed at the likelihood of a meeting taking place at an identified time and location. The ML manager (154) identifies factors of time and location as reflected in the model, and uses these factors to generate a probability output. In one embodiment, the ML manager (154) may implement a time range, e.g. a range of date, and a location of attendees and/or roles of the intended attendees. The ML manager (154) leverages the model(s) and assesses the probability of a meeting location(s) and date(s) happening. The probability output is a prediction of the meeting for the location(s) and date(s) taking place or being canceled. In one embodiment, the ML manager (154) receives a communication from the data manager (152) to update or re-assess the probability in response to collection of new data. Similarly, in one embodiment, the data manager (152) is monitoring and collecting data from an email thread and the ML manager (154) re-assesses the probability of the meeting location and date when a new email is added to the thread. In another embodiment, the data manager (152) monitors and collects data from the calendar, and the ML manager (154) re-assess the probability of the meeting location and date when calendar data that is related to the email thread is modified. Accordingly, the ML manager (154) interfaces with the data manager (152) to maintain the probability assessment current with the state of the collected and relevant data.

Using the collected data by the data manager (152) and the probability output produced by the ML manager (154), the operatively coupled recommendation engine (156) conducts an analysis of reinforcement learning for decision making with the goal of minimizing expected travel costs associated with the probability of the meeting time and location. The reinforcement learning recommends an action in the form of buy or wait for different times and locations based on historical price trends, the probability of the meeting taking place, and the probability of the meeting being canceled. In one embodiment, when the reinforcement learning produces multiple meeting times and locations with a recommendation of buy, the option with the lowest expected costs is recommended. The following formula is utilized by the recommendation engine (156) to minimize expected spending costs for a given location and time for a meeting:

$$Q(a,s(t_i,l_i))=R(a,s(t_i,l_i))+\max_{a'}Q(a',s'(t_i,l_i))$$

where a represents a factor of an action of buy or wait, and $s_{ti,li}$ is a state for the meeting at the ith time, t, and location, l. The state for the meeting, s, includes the transportation costs, route, and time of arrival prior to departure, all of which are factors in the costs of travel for business. The variable Q (a, $s_{ti,li}$) represents an adaptive function to be maximized, and the variable R (a, $s_{ti,li}$) represents an immediate reward function. The variable b represents the action of buy, and the variable w represents the action of wait. As shown, the immediate reward function of buy is represented as follows:

$$R(b,s(t_i,l_i))=-\text{price}(s(t_i,l_i))-(1-p(t_i,l_i))\times C(s(t_i,l_i))-\Sigma_{k=1,k\neq i}^n p(t_k,l_k)\times E(s(t_k,l_k))$$

where price ($s(t_i,l_i)$) is the travel costs, e.g. airplane ticket price, $(1-p(t_i,l_i))\times C(s(t_i,l_i))$ is the probability of the meeting being canceled, $C(s(t_i,l_i))$ is the cost of the meeting being canceled, and $\Sigma_{k=1,k\neq i}^n p(t_k,l_k)\times E(s(t_k,l_k))$ is the expected cost for reservation exchanges. Together $(1-p(t_i,l_i))\times C(s(t_i,l_i))$ represent the expected costs for cancelation. The immediate reward function of waiting to schedule travel and travel arrangement is represented as follows:

$$R(w,s(t_i,l_i))=0$$

Since there is no purchase involved in waiting, there is no price for the travel costs and there is no cost associated with cancelation or exchange.

The recommendation engine (156) formulates an objective function based on considering multiple factors and produces output in the form of a recommendation to buy, e.g. book travel for the meeting time and location, or wait. The recommendation output includes the recommendation engine (156) to selectively conduct an action correlating with the recommendation. Accordingly, as shown herein the recommendation engine (156) formulates an objective function based on considering multiple factors, generates an output from the objective function, and applies the generated output to selectively conduct travel arrangements.

Figure 2:
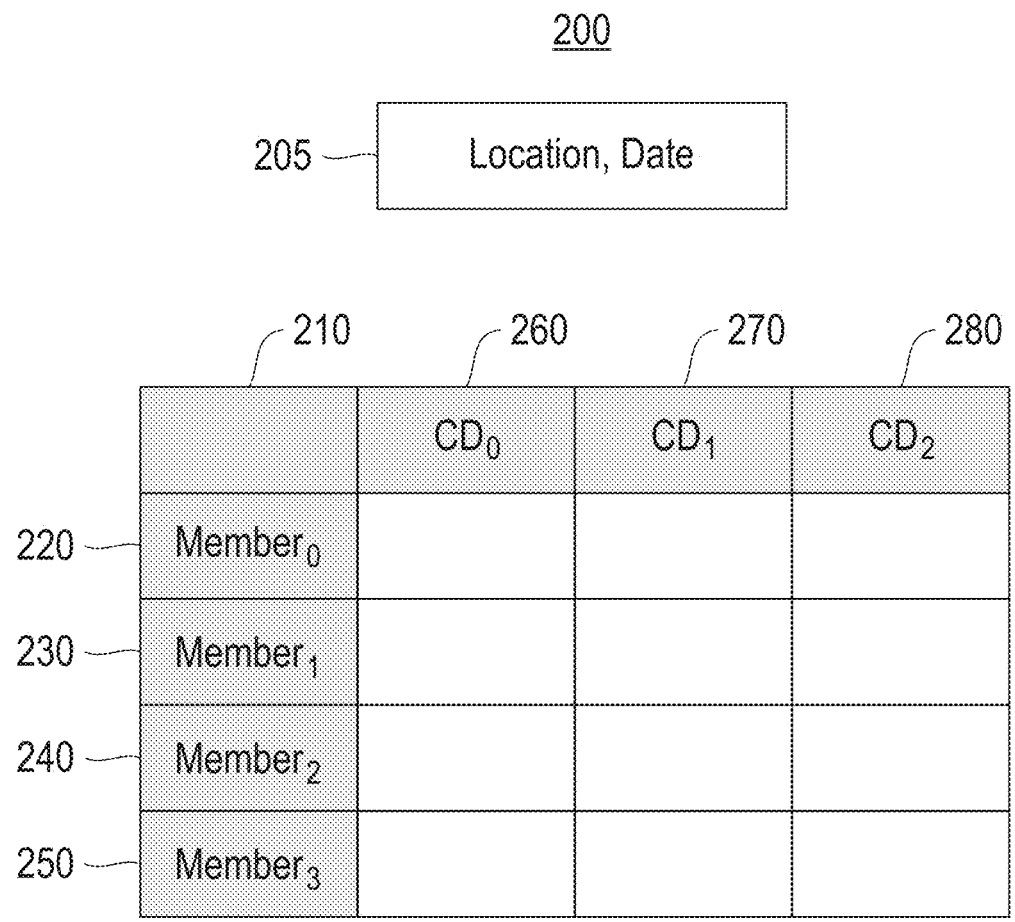
FIG. 2 depicts a block diagram illustrating an example classification matrix.

Referring to FIG. 2, a block diagram (200) is provided to illustrate an example classification matrix (210), hereinafter referred to as a model. As shown, the model (210) is a two-dimensional representation with rows and columns. The rows represent members of the communication thread that are the subject of the listening, and the columns represent characteristics data, such as email metadata and travel activities. In one embodiment, different or additional characteristic data may be represented in the model. As shown in this example, four members are represented in the rows, including member$_0$ (220), member$_1$ (230), member$_2$ (240), and member$_3$ (250). The characteristic data, CD, are shown and represented as CD$_0$ (260), CD$_1$ (270), and CD$_2$ (280). Although only three columns of characteristic data are shown, the quantity should not be considered limiting. Examples of the characteristic data include, but are not limited to, job role of the member, office location of the member, email data content, email metadata, etc. In one embodiment, some of the characteristic data may be obtained or pulled from a human resources (HR) database. Details of the probability assessment and corresponding data are shown and described in FIG. 5. The probability assessment conducted by the ML model infers the probability of meeting locations and dates based on email thread, user profiles (location, roles, etc), as reflected and organized in the matrix (210). Accordingly, the ML model uses data reflected in the matrix (210) as input and generates a probability of a meeting date and location for one or more combinations of dates and locations.

The analysis conducted by the recommendation engine (156) creates a measurement of impact on travel and travel related costs, and is conducted dynamically. As shown, the ML manager (154) is operatively coupled to the data manager (152). The ML manager (154) conducts supervised learning responsive to electronic mail and calendar data or changes corresponding to the mail and calendar data. The ML manager (154) leverages changes in the electronic mail and calendar to dynamically update the probability assessment, and reflects the update(s) in one or more corresponding models. The recommendation engine (156) orchestrates a sequence of actions responsive to the detected electronic mail and calendar activities and secondary data sources. Examples of secondary data sources include, but are not limited to, flight price history, flight route, flight schedule, and cancellation and exchange policies. In one embodiment, the secondary data includes historical price trends associated with the different travel components. The secondary data sources are accessible to the recommendation engine (156) across the network (105). It is understood that the secondary data is dynamic and may affect the produced outcome (172). The recommendation engine (156) generates a policy based on data obtained from one or more secondary data sources and output from the ML manager (154), with the generated policy being in the form of a recommendation of actions and to direct selective booking of travel arrangements while minimizing risk.

The data mining and supervised learning conducted by the data manager (152) and ML manager (154), respectively, may be conducted offline or as one or more background processes. The ML manager (154), which is shown herein operatively coupled to the data manager (154), functions as a tool to dynamically generate a probability assessment for the data gathered by the data manager (152). The ML manager (154) employs a supervised learning algorithm to assess probability of outcomes, such as probability of meeting location(s) and date(s), as well as probability of cancellation. The recommendation engine (156) leverages the probability to assess and to maximize utility of outcomes.

The ML manager (154) enables and supports use of machine learning (ML) with respect to optimization of the probability assessment. In one embodiment, a corresponding machine learning model (MLM) encapsulates a corresponding ML algorithm. The MLM functions to dynamically learn values of meeting scheduling characteristics as the characteristic data are subject to change. The ML manager (154) discovers and analyzes patterns, and corresponding risks and rewards. As patterns evolve, the ML manager (154) may dynamically amend a prior probability assessment. The ML manager (154) supports elasticity and the complex characteristics of diverse meeting scheduling activities across a plurality of devices in the network. Accordingly, patterns of activity data are learned over time and used for dynamically orchestrating or amending the probability assessment.

Response output (172) in the form of one or more of the derived actions, such as a sequence of actions or an amended sequence of actions, is communicated or otherwise transmitted to the processing unit (112) for execution. In one embodiment, the response output (172) is communicated to a corresponding network device, shown herein as a visual display (170), operatively coupled to the server (110) or in one embodiment, operatively coupled to one or more of the computing devices (180)-(190) across the network connection (104).

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (160) is configured with logically grouped domains ($162_A$)-($162_C$) and corresponding models ($164_A$)-($164_C$), respectively, for use by the AI platform (150). In one embodiment, the knowledge base (160) may be configured with other or additional sources of input, and as such, the sources of input shown and described herein should not be considered limiting. Similarly, in one embodiment, the knowledge base (160) includes structured, semi-structured, and/or unstructured content related to activities and tasks. The various computing devices (180)-(190) in communication with the network (105) may include access points for the logically grouped domains and models. Some of the computing devices may include devices for a database storing the corpus of data as the body of information used by the AI platform (150) to generate response output (172) and to communicate the response output to a corresponding network device, such as a visual display (170), operatively coupled to the server (110) or one or more of the computing devices (180)-(190) across network connection (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the network (105), is configured to detect and manage network activity and task data as related to travel and travel scheduling. The AI platform (150) may effectively orchestrate or optimize an orchestrated sequence of actions directed at related activity data by leveraging the knowledge base (160), which in one embodiment may be operatively coupled to the server (110) across the network (105).

The AI platform (150) and the associated tools (152)-(156) leverage the knowledge base (160) to support orchestration of the sequence of actions, and supervised learning to optimize the sequence of actions. The recommendation engine (156) leverages the probability assessment conducted by the ML manager (154), and orchestrates an action or a sequence of actions directed at travel and travel schedule activities and corresponding travel related tasks. Accordingly, the tools (152)-(156) mitigate risk associated with travel arrangement cancelation or rescheduling by assessing such probability associated with correlated actions, orchestrating a recommendation, and dynamically optimizing the recommendation orchestration.

Electronic mail data and calendar entries are subject to change, and the ML manager (154) and the recommendation engine (156) are configured to dynamically respond to detected changes. It is understood that as the electronic mail data and/or calendar entry data changes, a corresponding probability assessment may be subject to change. The ML manager (154) is configured to dynamically adjust to such changes, including, but not limited to learning values of states or state histories, and mapping states to probability assessment actions.

Activity data, e.g. electronic mail and calendar entries, received across the network (105) may be processed by a server (110), for example IBM Watson® server, and the corresponding AI platform (150). As shown herein, the AI platform (150) together with the embedded managers (152)-(154) and engine (156) to perform an analysis of the activity data and tasks, dynamically conduct or update a probability assessment, as well as generate one or more recommendations for selection. The function of the tools and corresponding analysis is to embed dynamic supervised learning to minimize risk involved in travel scheduling. Accordingly, the AI platform (150) evaluates and correlates cross-impact between different domains and designs an optimization to minimize risk associated with rescheduling or cancellation.

In some illustrative embodiments, the server (110) may be the IBM Watson® system available from International Business Machines Corporation of Armonk, N.Y., which is augmented with the mechanisms of the illustrative embodiments described hereafter. The manager (152)-(154) and engine (156), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to dynamically optimize activities to minimize, or otherwise mitigate, risk.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 3:
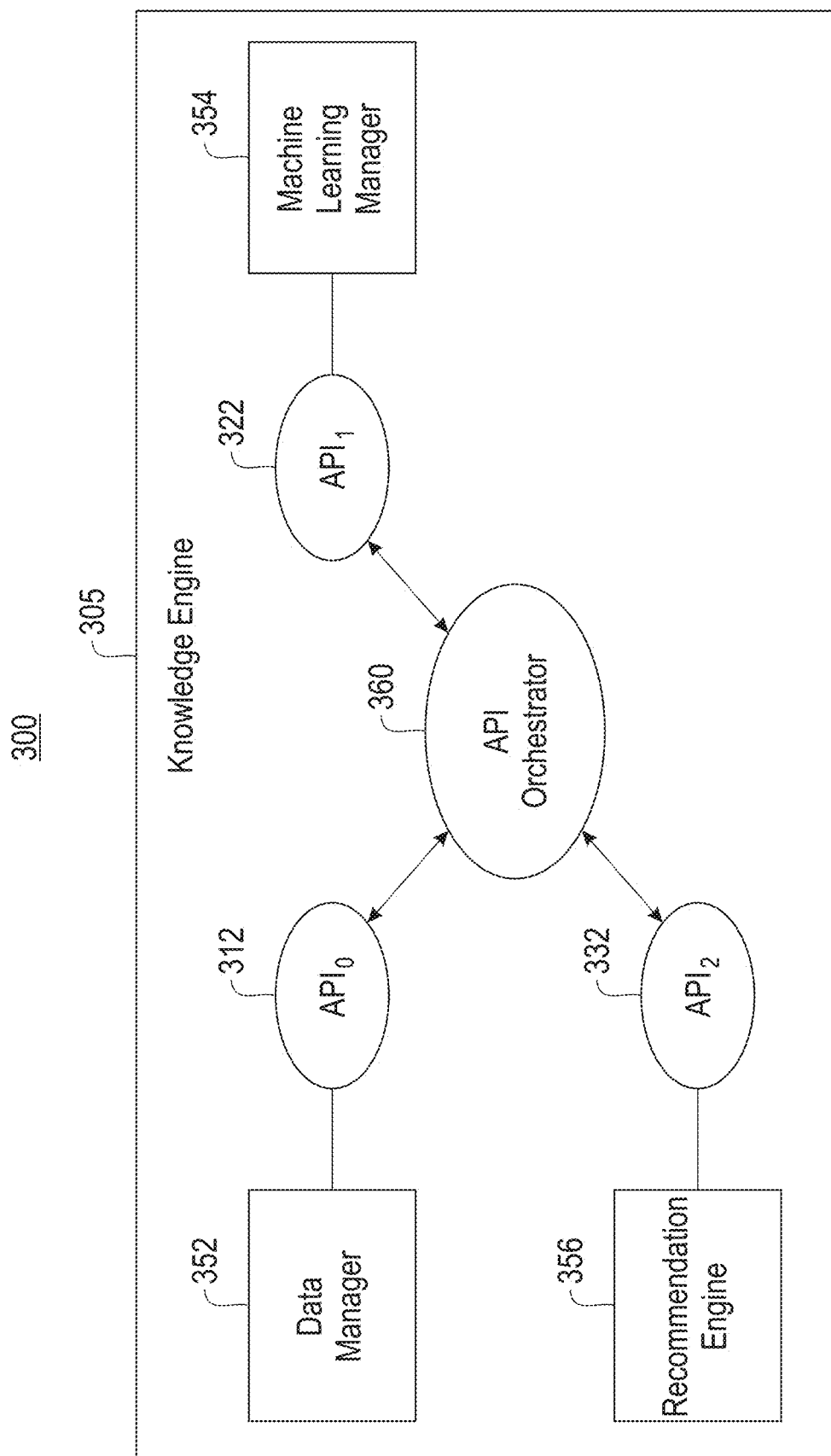
FIG. 3 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 3, a block diagram (300) is provided illustrating the tools (352)-(356) and their associated APIs. As shown, a plurality of tools is embedded within the AI platform (305), with the tools including the data manager (152) shown herein as (352) associated with $API_0$ (312), the ML manager (154) shown herein as (354) associated with $API_1$ (322), and the recommendation engine (156) shown herein as (356) associated with $API_2$ (332). Each of the APIs may be implemented in one or more languages and interface specifications. $API_0$ (312) provides functional support to collect and collate activity data across two or more domains; $API_1$ (322) provides functional support for ML and supervised learning for probability assessment corresponding to the collected and collated activity data; and $API_2$ (332) provides functional support to dynamically optimize and orchestrate a travel scheduling recommendation to minimize risk and maximize reward. As shown, each of the APIs (312), (322), and (332) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
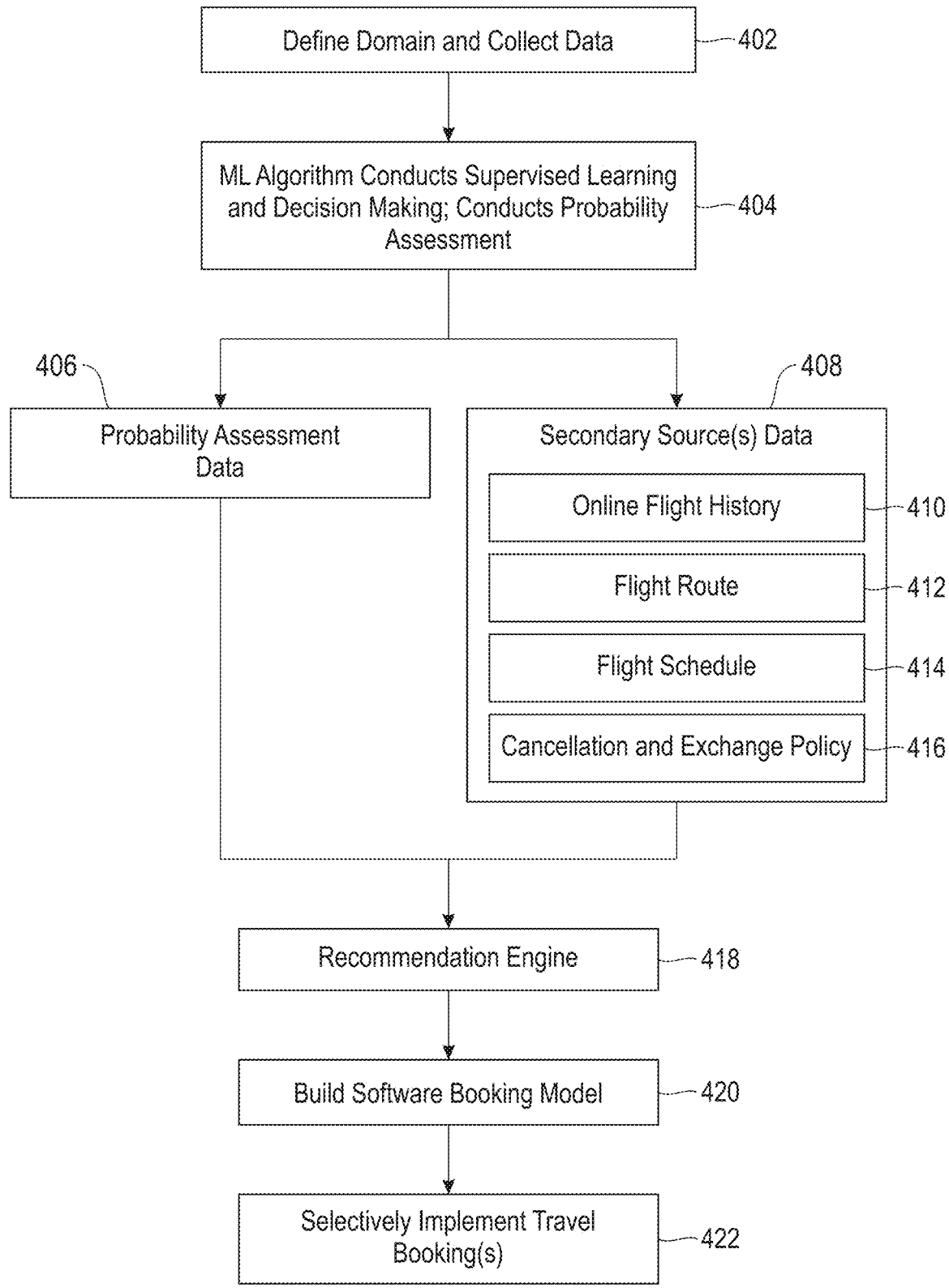
FIG. 4 depicts a flow chart illustrating functionality of orchestration for correlating activity data and assessing probability across activities.

Referring to FIG. 4, a flow chart (400) is provided illustrating functionality of orchestration for correlating activity data and assessing probability across activities. A domain is defined and data is collected from the defined domain (402). In one embodiment, the domain is comprised of members and includes a plurality of electronic mail addresses and corresponding electronic calendars for the domain members. Although the process described herein is applied to a single domain, it is understood that multiple domains may be configured or defined for supervised learning and decision making. As shown and described in FIG. 1, a ML algorithm is utilized to conduct the supervised learning, and more specifically, to conduct a probability assessment for scheduling (404). Referring to FIG. 2 and at step (404), the ML algorithm generates a multiclass classification model, hereinafter referred to as a model, for each domain. The model organizes the collected data for the corresponding domain with entries in the model reflecting a probability value as assessed by the applied ML algorithm. In one embodiment, the model is dynamically revised at such time as data in the corresponding domain is amended, e.g. new email is received, a calendar entry is changed, membership in the domain is amended, etc. Accordingly, the ML algorithm extracts data from the domain threads and conducts a corresponding probability assessment.

There are two sources of input to the recommendation engine, including output from the probability assessment in the form of the classification model (406), as shown and described in FIG. 2, and secondary data received or obtained from a plurality of secondary data sources (408). In one embodiment, the secondary data is collected from a plurality of domains, which in one embodiment may operate independently. With respect to travel and travel scheduling, the secondary data may include airline flight price history data (410), flight route data (412), flight schedule data (414), and airline cancellation and exchange policy data (416). The recommendation engine pulls data from both the output from the probability assessment and the secondary data (418) and builds a software booking model (420). In one embodiment, at step (420) the recommendation engine creates a recommendation, such as buy or wait, for travel arrangements and travel booking based on the parameters received at steps (406) and (408). The travel arrangements and booking are selectively implemented (422). In one embodiment, the travel arrangements may have multiple components, and the selective implementation enables selection of less than all of the travel arrangement components. Similarly, in one embodiment, the selective implementation is reflected in the purchase, e.g. booking, of one or more of the travel components, or waiting, e.g. not booking. In another embodiment, program code or a script may be employed for the selective implementation. Similarly, in one embodiment, the travel arrangements and components may be presented on a visual display with indicia conveying an associated recommendation. Accordingly, output from the recommendation is provided to facilitate implementation of corresponding travel arrangements.

Figure 5:
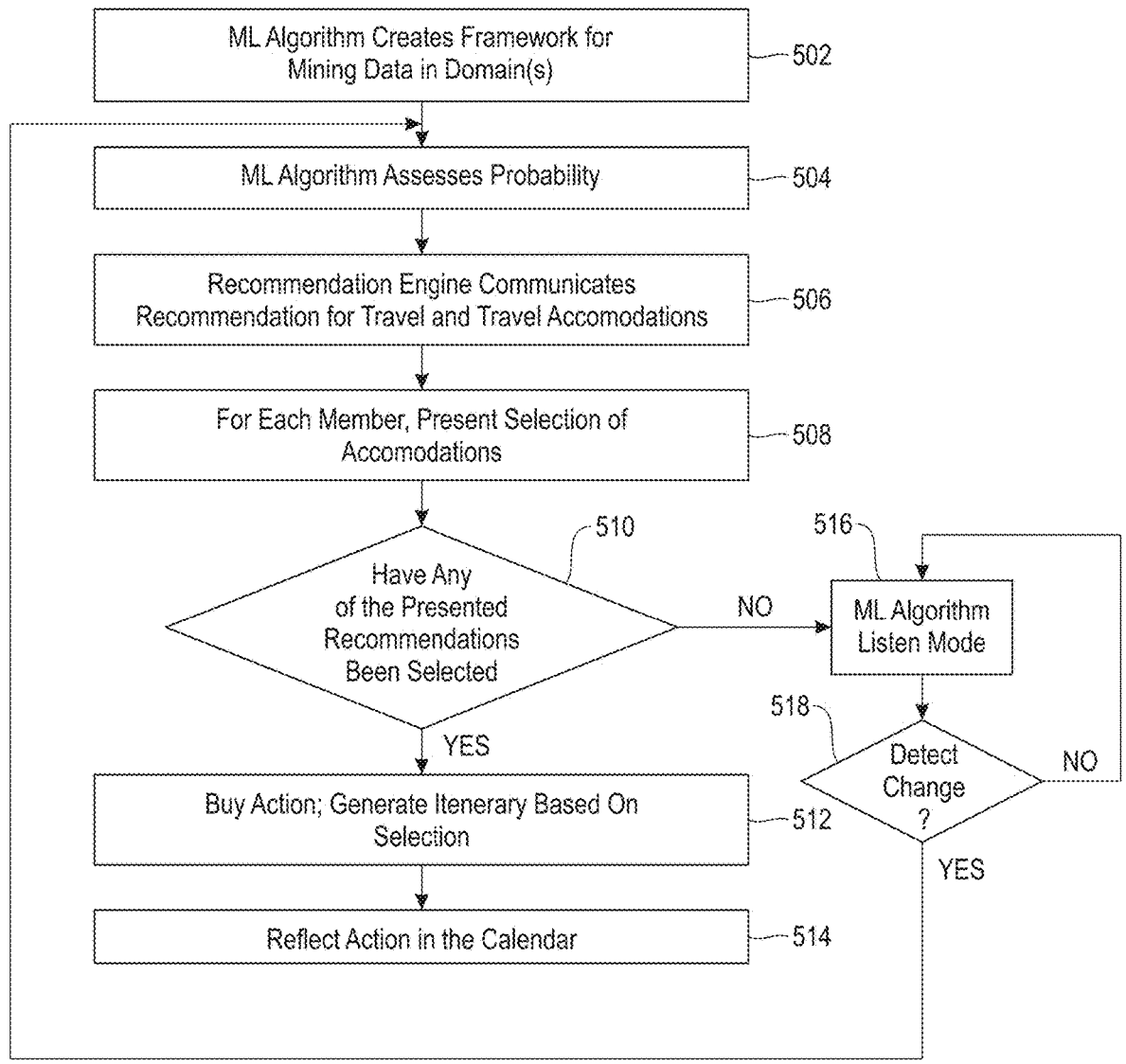
FIG. 5 depicts a flow chart illustrating dynamic characteristics of the ML algorithm.

Referring to FIG. 5, a flow chart (500) is provided illustrating dynamic characteristics of the ML algorithm. As shown, a framework of the model from primary data sources is organized, e.g. email thread and electronic calendar, (502). The ML algorithm calculates a probability of the meeting schedule being maintained at one or more suggested locations and time, and populates the probability into the model (504). Both the model populated at step (504) and second source data are used as input to the recommendation engine. Using the output from the recommendation engine, an arrangement of travel accommodations that have been selectively recommended are communicated (506). A selection of one or more of the recommended accommodations are presented or otherwise conveyed to the members (508), and it is determined if any of the travel accommodations have been selected or booked (510). A positive response to the determination at step (510) is conveyed in the form of a buy action, and a copy of a corresponding travel itinerary, including reservation details and identifiers, is created and presented (512). In addition, an entry is created or amended in the calendar associated with the thread confirming attendance for the scheduled meeting (514). However, a negative response to the determination at step (510), is followed by the ML algorithm entering a listen mode with respect to the primary data sources, and in one embodiment the secondary data sources (516). In one embodiment, the recommendation engine launches a script to listen for changes on the secondary data sources as related to the domain. At such time as a change is detected in either the primary or secondary data source (518), or both, the process returns to step (504) to dynamically reflect the change and re-assessed probability into the model. If no change is detected, the ML algorithm continues to listen (516). Accordingly, the ML algorithm listens for changes to the primary and secondary data sources.

The buy action at step (512) may or may not be the conclusion of the process. It is understood that travel plans are fluid and subject to change, cancellation, modification, etc. The process shown herein reflects such fluid characteristics. In one embodiment, and until such time as the meeting takes place, the listening mode of the ML algorithm, and in one embodiment the listening script of the recommendation engine continue as background processes. It is understood that the listening at step (516) includes monitoring a corresponding email thread to detect itinerary changes, which in one embodiment may include cancelation of the meeting, which would cancel or reschedule travel reservations as reflected in the itinerary. Accordingly, listening to the primary and secondary data sources facilitates thread monitoring and probability re-assessment.

An example reinforcement learning algorithm is described above in the description of the system in FIG. 1. It is understood that this is an example learning algorithm, and as such should not be considered limiting. In one embodiment, an alternative reinforcement learning algorithm may be employed for optimization of the orchestrated list or characteristic data. Output from the reinforcement learning algorithm learns values of different states and generates a list of actions to execute to enable fruition of the intended or scheduled meeting while minimizing risk. One or more actions from the generated list are selectively executed to attain a desired level of compliance for the scheduled meeting. Accordingly, the reinforcement learning shown and described herein dynamically learns values of different states, from both the primary and secondary data sources, which may then be applied to minimize risk while enforcing compliance.

Embodiments shown and described herein may be in the form of a computer system for use with an intelligent computer platform for providing orchestration of activities across one or more domains to minimize risk. Aspects of the tools (152)-(156) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system, tools, and processes described above with respect to FIGS. 1-4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
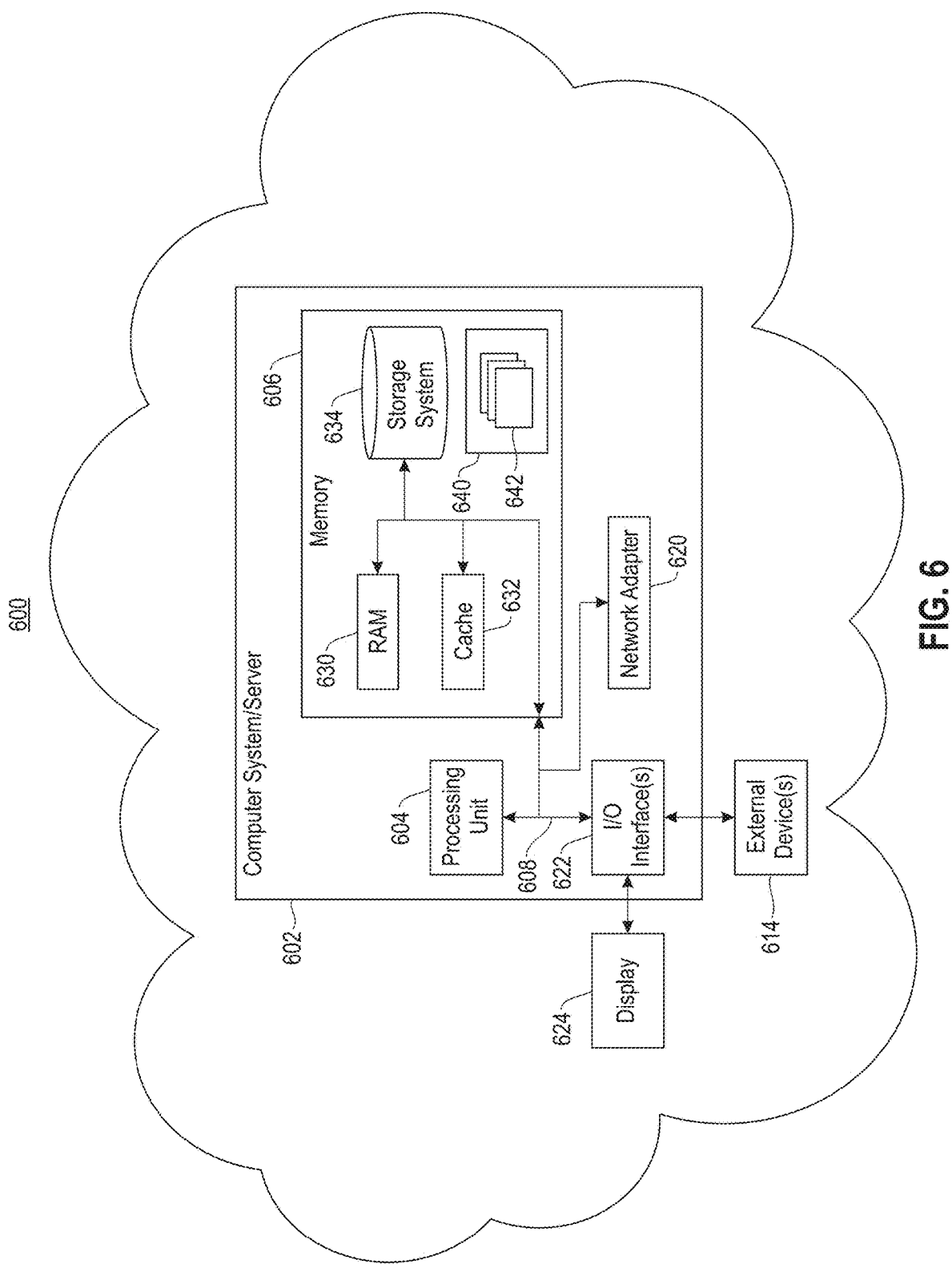
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically orchestrate of activities across one or more domains to minimize risk. For example, the set of program modules (642) may include the tools (152)-(156) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
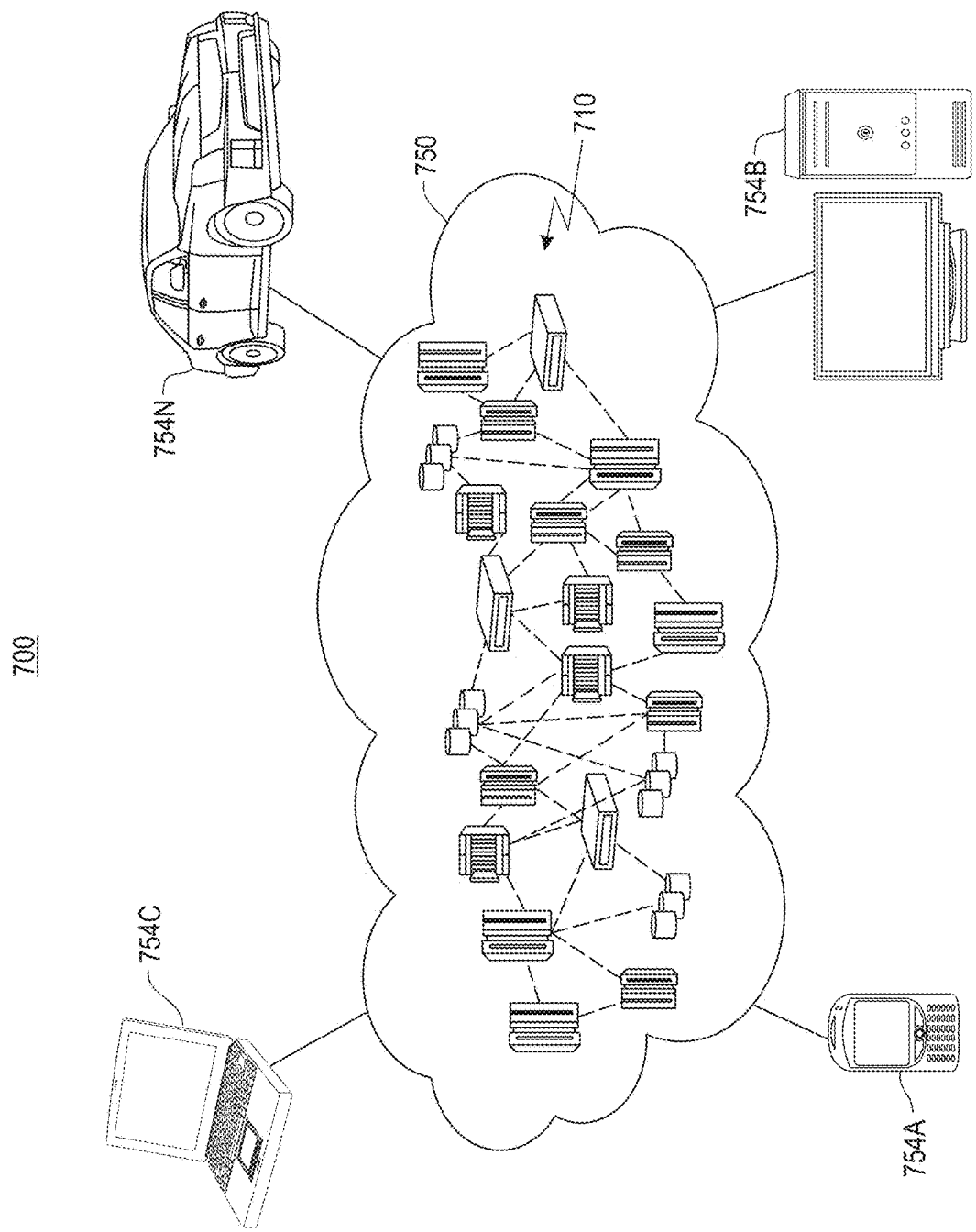
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
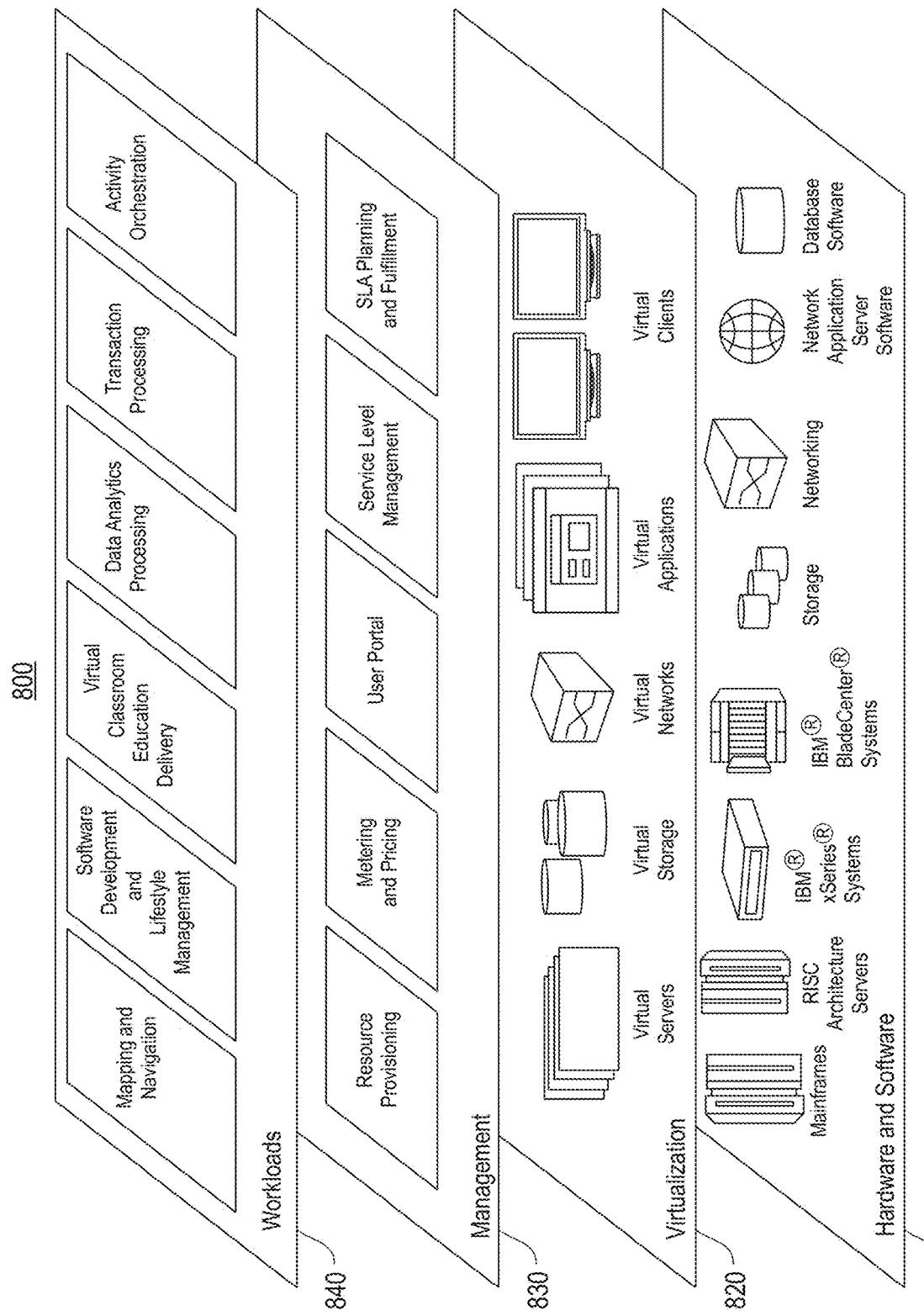
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and activity orchestration.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve orchestration of travel activities and meeting scheduling.

Aspects of the present embodiments are described herein with reference to flowchart illustrations and/or block diagrams of methods, apparatus (systems), and computer programs products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A system comprising:
    a processing unit operatively coupled to memory; and
    an artificial intelligence (AI) platform in communication with the processing unit, the AI platform configured to monitor and evaluate data and minimize risk across two or more domains, the AI platform including:
        a data manager configured to extract features from one or more primary data sources across two or more domains, and configured to identify activity data for at least two participants within the extracted features, the activity data comprising respective scheduling information for the at least two participants;
        a machine learning (ML) manager configured to:
            leverage one or more models to dynamically learn values of meeting scheduling characteristics and calculate a risk probability of a meeting of the two or more participants happening at a location and time; and
        a recommendation engine configured to:
            generate a policy from the calculated risk probability, the policy comprising a recommendation of at least one action relating to one or more travel elements associated with the meeting; and
            selectively execute one or more encoded actions in compliance with the policy.

2. The system of claim 1, wherein the recommendation engine is further configured to employ reinforcement learning to calculate a reward based on the calculated risk probability.

3. The system of claim 2, wherein the recommendation engine is further configured to leverage the calculation to minimize risk and maximize reward across two or more domains.

4. The system of claim 1, wherein the data manager is further configured to detect thread activity data and dynamically update corresponding activity data with the thread activity data.

5. The system of claim 4, wherein the ML manager is further configured to dynamically incorporate the dynamically updated activity data into the one or more models, including the ML manager further configured to re-calculate the risk probability based on the dynamically updated activity data.

6. The system of claim 2, wherein the recommendation engine is further configured to leverage one or more secondary data sources to obtain secondary data, and is further configured to incorporate the obtained secondary data into the reinforcement learning calculation.

7. A computer program product to monitor and evaluate data and minimize risk across two or more domains, the computer program product comprising:
a computer readable storage medium having program code embodied therewith, the program code executable by a processor to:
extract features from one or more primary data sources across two or more domains;
identify activity data for at least two meeting participants within the extracted features, the activity data comprising respective scheduling information for the at least two participants;
leverage one or more models to dynamically learn values of meeting scheduling characteristics and calculate a risk probability of a meeting of the two or more participants happening at a location and time;
generate a policy from the calculated risk probability, the policy comprising a recommendation of at least one action relating to one or more travel elements associated with the meeting; and
selectively execute one or more encoded actions in compliance with the policy.

8. The computer program product of claim 7, further comprising program code executable by the processor to employ reinforcement learning to calculate a reward based on the calculated risk probability.

9. The computer program product of claim 8, further comprising program code executable by the processor to leverage the calculation to minimize risk and maximize reward across two or more domains.

10. The computer program product of claim 7, further comprising program code executable by the processor to detect thread activity data and dynamically update corresponding activity data with thread activity data.

11. The computer program product of claim 10, further comprising program code executable by the processor to dynamically incorporate the dynamically updated activity data into the one or more models, including re-calculate the risk probability based on the dynamically updated activity data.

12. The computer program product of claim 8, further comprising program code executable by the processor to leverage one or more secondary data sources to obtain secondary data, and to incorporate the obtained secondary data into the reinforcement learning calculation.

13. A method for monitoring and evaluating data and minimizing risk across two or more domains, the method comprising:
using a computer processor:
extracting features from one or more primary data sources across two or more domains;
identifying activity data for at least two meeting participants within the extracted features, the activity data comprising respective scheduling information for the at least two participants;
leveraging one or more models to dynamically learn values of meeting scheduling characteristics and calculate risk probability of a meeting of the two or more participants happening at a location and time;
generating a policy from the calculated risk probability, the policy comprising a recommendation of at least one action relating to one or more travel elements associated with the meeting; and
selectively executing one or more encoded actions in compliance with the policy.

14. The method of claim 13, further comprising, using the computer processor, employing reinforcement learning to calculate a reward based on the calculated risk probability.

15. The method of claim 14, further comprising, using the computer processor, leveraging the calculation to minimize risk and maximize reward across two or more domains.

16. The method of claim 13, further comprising, using the computer processor, detecting thread activity data and dynamically updating corresponding activity data with the thread activity data.

17. The method of claim 16, further comprising, using the computer processor, dynamically incorporating the dynamically updated activity data into the one or more models, including re-calculating the risk probability based on the dynamically updated activity data.

18. The method of claim 14, further comprising, using the computer processor, leveraging one or more secondary data sources to obtain secondary data, and incorporating the obtained secondary data into the reinforcement learning calculation.

19. The system of claim 6, wherein the secondary data comprises historical travel prices.

20. The method of claim 18, wherein the secondary data comprises historical travel prices.

* * * * *